(No Model.) 2 Sheets—Sheet 2.
J. LYNAM & E. W. RUSSELL.
FRUIT DIPPING APPARATUS.
No. 556,826. Patented Mar. 24, 1896.
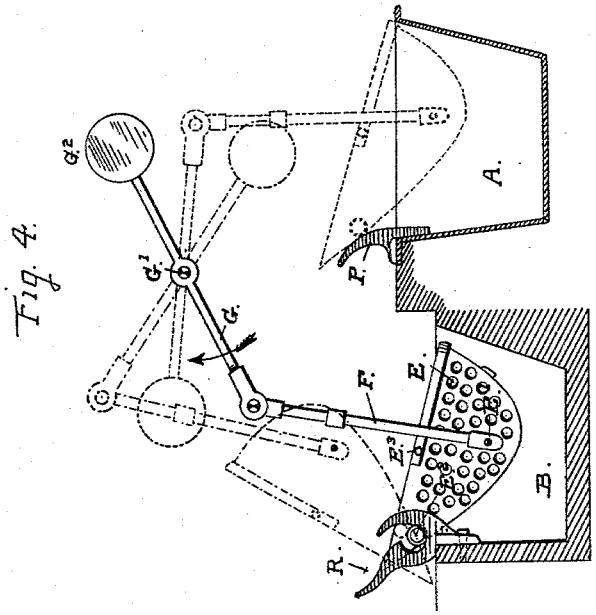
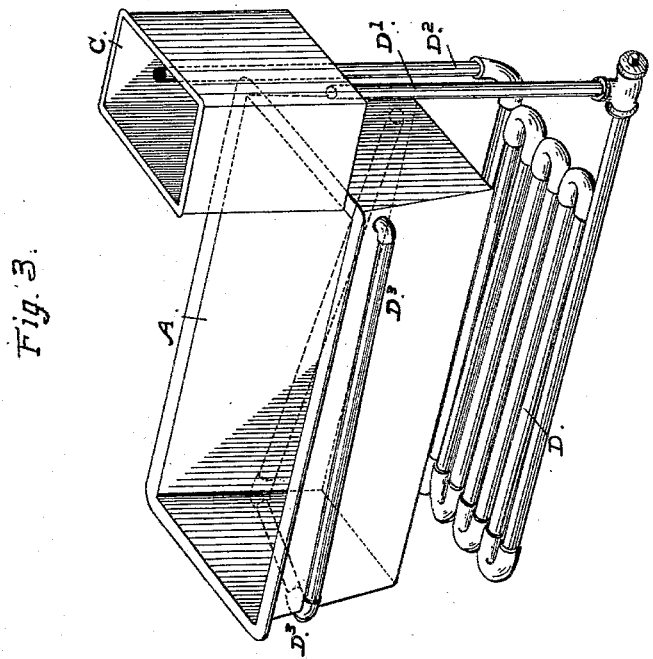
Witnesses:
Inventors:

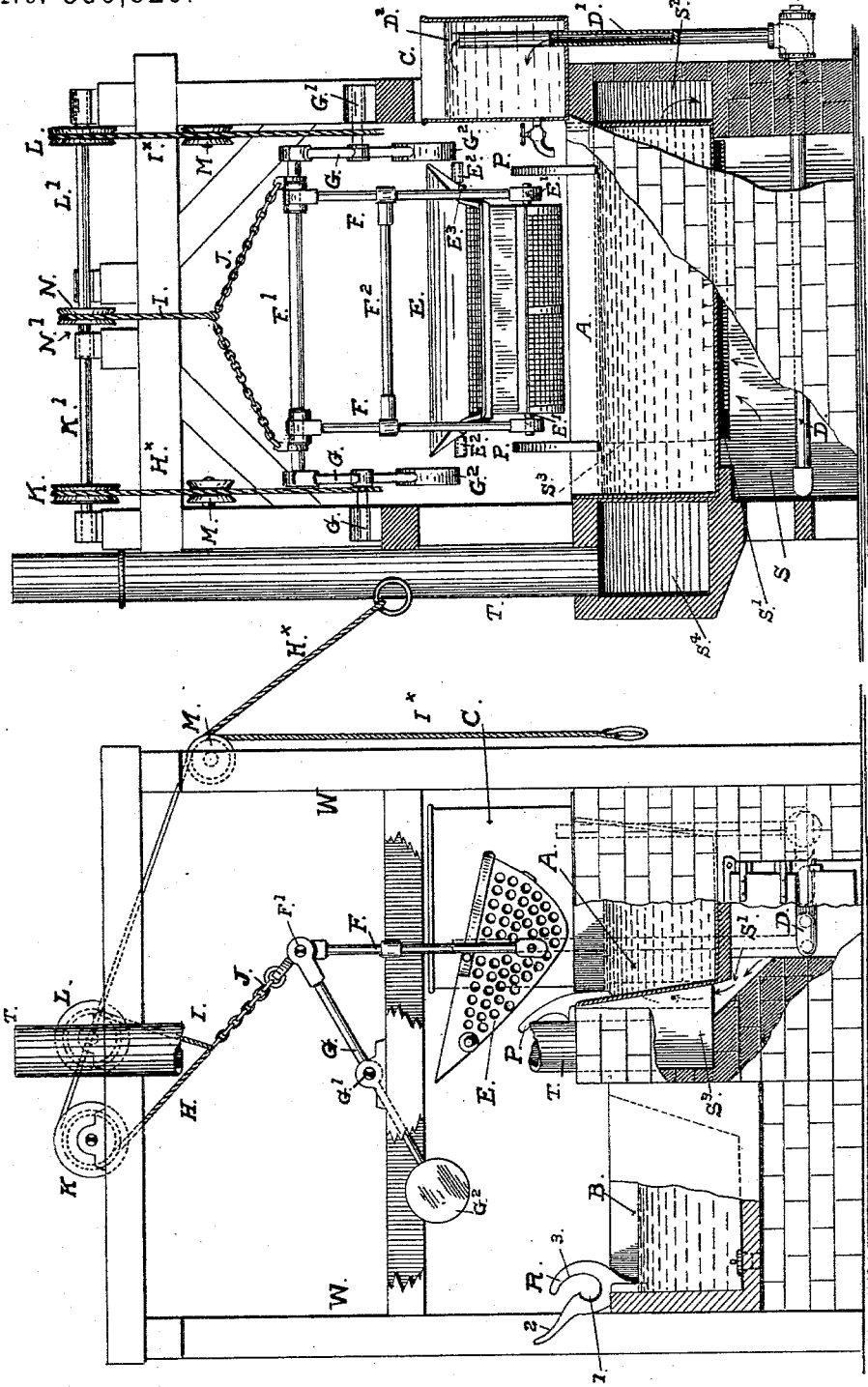

UNITED STATES PATENT OFFICE.

JOSEPH LYNAM AND ELBRIDGE WILKINS RUSSELL, OF SAN JOSÉ, CALIFORNIA.

FRUIT-DIPPING APPARATUS.

SPECIFICATION forming part of Letters Patent No. 556,826, dated March 24, 1896.

Application filed November 6, 1895. Serial No. 568,134. (No model.)

*To all whom it may concern:*

Be it known that we, JOSEPH LYNAM and ELBRIDGE WILKINS RUSSELL, citizens of the United States, residing in the city of San José, in the county of Santa Clara and State of California, have invented certain new and useful Improvements in Fruit-Dipping Apparatus, of which the following is a specification.

In the process of drying prunes and other kinds of pulpy fruits at the present time it is the practice to break and soften the skin preparatory to the drying operation by immersing the fresh fruit for a short period of time in a bath of hot lye-water, and this operation, commonly called "dipping," is performed on a large scale and with a considerable saving of time by means of apparatus consisting principally of a swinging basket or receptacle suspended over a tank containing the hot liquid and in such convenient relation also to a cold-water tank that the receptacle being loaded with the fresh fruit is dipped readily into the hot liquid and afterward into the cold water to check the destructive effects of the hot liquid and wash it from the fruits before they are spread upon the drying-trays.

Our invention, which relates to dipping apparatus for carrying on such operation, has for its object to produce a simple, easily-operated and efficient apparatus having several points or features of advantage over apparatus of the kind now in use, as hereinafter more fully explained; and to such end and object our invention consists in a swinging basket and operating mechanism of novel construction and arrangement, in a hot-liquid tank and a heating apparatus of novel construction, and in the general combination and arrangement of said parts together in a frame constituting a machine or apparatus capable of being operated with ease and readiness, and of handling and thoroughly treating a large quantity of fruit in a small period of time.

The following description explains at length the nature of our said improvements and the manner in which we proceed to construct and carry out the same, reference being had to the accompanying drawings, that form a part of this specification.

In the said drawings, Figure 1 represents in front elevation a dipping machine or apparatus constructed according to our invention, portions of the frame and brickwork setting being broken away to expose covered parts. Fig. 2 is an elevation, partly in section, taken from the right-hand side of Fig. 1. Fig. 3 is a view in perspective of the hot-liquid tank and the heating-coils. Fig. 4 is a diagram representing the different positions assumed by the dipping-basket in its movements.

A indicates the dipping-tank containing the hot liquid.

B is the washing-tank holding cold water.

C is a hot-water reservoir from which the dipping-tank is replenished from time to time as needed to maintain the body of hot liquid at proper working level, and D is a heating-coil connected with the hot-water receptacle and forming the grate-surface of the furnace S under the liquid-tank.

E is a fruit-holding basket, and F F G a swinging frame by which the basket is suspended in the framework W from points of oscillation G' G' over the dipping and washing tanks.

$G^2$ are weights on the ends of the arms G to counterbalance the basket and its load. The addition of these weights renders the loaded basket much easier to swing and handle.

H and I are operating-cords attached to the swinging frame of the basket and laid around two sheaves N N', each of which is fixed on its own separate axle K' L'.

K and L are sheaves or grooved wheels fixed on the separate axles before mentioned. The hand-ropes $H^\times$ $I^\times$ are attached to these wheels and are carried from them over the guide-sheaves M M in convenient position to be reached and worked by an operator standing at the side of the tank.

The ropes and the cords before mentioned are laid around their respective pulleys, as seen in Figs. 1 and 2. The cord H is carried from the chain-sling J up to and around the sheave N, and is fastened at the end to that sheave which is fast on the axle K' of the outside sheave K. The rope $H^\times$ being made fast to that outside sheave is laid in one or more turns in its groove, and is carried to the side of the frame and down over the pulley M.

Thus by pulling on the rope $H^\times$ the basket-carrying frame is drawn over the centers $G'$ in the direction indicated by the arrow in Fig. 1, whereby the basket is raised out of the tank A and is brought over the other tank, this movement being produced by the unwinding of the rope $H^\times$ from the sheave K and the winding of the cord H upon the sheave N. After the basket is brought over the tank B it is lowered into the water by slackening the rope $H^\times$. In like manner the second cord, I, which is attached to the sling J at the same point with the cord H, is laid from beneath around the sheave $N'$. That sheave being fast on the axle $L'$ and the rope $I^\times$ that is fast to the wheel L on that axle being laid in several turns in the groove of that wheel, then by drawing on the rope $I^\times$ the basket is brought back over the dipping-tank, and by slackening on the rope the basket is lowered into the hot-liquid tank.

The dipping-basket is tilted mechanically to discharge the contents by the fixed hooks R on the tank B and the roller-studs on the sides of the basket, which engage and are held by the hooks when the basket is dipped into the tank. These studs $E^2$ slip into the recesses 1 of the hooks R when the basket is lowered, and in the contrary movement of the basket as it is raised out of the tank the horn 2 catches the roller-stud, and holding down the flaring front or discharge end of the basket causes it to tilt and discharge its contents over the side of the tank. At the end of that operation the studs $E^2$ are disengaged from the hooks by dropping the basket back with a short quick movement. This is done by slackening the rope $I^\times$, and as the basket becomes detached from the hooks it is drawn up and afterward swung over and lowered into the hot-liquid tank by working the same rope $I^\times$. Thus by the rope $H^\times$ the basket is raised out of the first tank A and is lowered into the second tank B, and by the other rope, $I^\times$, the basket is first tilted to discharge its contents, and is brought back into the first tank again for reloading.

The construction and arrangement of the hooks R are shown in Figs. 1, 2, and 4 of the drawings. The function of the curved arm or part 3 is to guide the roller-studs $E^2$ of the basket into the recess 1, and the function of the horn or overhanging arm 2 is to catch the studs and thereby hold down the mouth of the basket while the rear end is being elevated.

The curved guides P on the side of the hot-liquid tank are fixed in position to engage the studs $E^2$ when the basket is lowered into that tank, and thereby throw up the front end and depress the opposite end of the basket, so that the contents will be immersed beneath the level of the liquid.

In the construction of the hot-liquid tank provision is made for keeping the liquid always in a heated condition at proper temperature, and also for supplying hot water with which to replenish the tank from time to time as the working level of the liquid is reduced.

The water-box C above the tank A is connected by upright pipes $D'$ $D^2$ with a horizontal coil D, which forms the grate-surface of the furnace S beneath the tank, so that the water contained in the box is kept at high temperature by circulating through the coil D. A cock $C'$ in the front of the box C is provided for running hot water into the tank from time to time as required to replenish that which is taken up by the fruit. As the frequent dipping of cool fruit in this tank has a tendency to lower the temperature of the liquid, provision is made for increasing the heating capacity of the furnace to obtain the full benefit of the fire without excessive use of fuel by connecting to the tank on the outside a circulating-pipe $D^3$. This pipe is laid around the outside of the tank through the smoke and combustion passages in the brick setting and is connected at one end to the lower part and the opposite end to the upper part of the tank that the liquid will circulate through such pipe.

The fire-chamber S beneath the tank connects with the aforesaid passages around the tank through the aperture $S'$ in one side wall of the chamber, and such passages extending around the rear end and along the opposite side communicate with the smoke-pipe T in the smoke-chamber at the front of the furnace, from which chamber that pipe extends to the top of the framework. The wall $S^3$ at the front end separates that smoke-chamber from the combustion-passage, so that the flames and products from the fire-chamber E must pass entirely around the rear end of the tank and along the opposite side to the front before they enter the smoke-pipe.

The frame in which the basket is hung is formed of the parallel side bars F F and the horizontal cross-bars $F'$ $F^2$. The side bars swing loosely on the top cross-bar $F'$ and are attached by pivots $E'$ at the lower ends to the sides of the basket. To the said cross-bar $F'$ is attached the sling J, to which the operating-cords H I are connected, and to the outer ends of the top cross-bar are attached the ends of the pivoted arms G, one at each side of the swinging frame. These arms are arranged to swing on the pivots or fixed points $G'$ on the stationary framework in the spaces between the sides of the basket and the timbers of the frame. Thus the frame swinging on these centers $G'$ carries the basket in an arc from one side to the other across the center of oscillation and holds it at all times in upright position while traveling from one tank to the other.

The counterweights $G^2$ balance the weight of the basket and its load during such movements, and relieves the workman of the labor involved in raising the basket when loaded. The stops $E^3$ on the sides of the basket serve to keep it in upright position while traveling with its load from one tank to the other.

Having thus fully described our invention, what we claim as new therein, and desire to secure by Letters Patent, is—

1. The combination, of a suitable framework, a dipping-tank and a washing-tank arranged side by side therein; a swinging frame composed of the rigidly-connected parallel side bars, the top cross-bar to which said side bars are connected at the upper ends and the swinging arms pivoted in said framework to swing in a vertical arc over said tanks; the dipping-basket pivoted in said frame between the said side bars; the counterweights on the outer ends of said swinging arms adapted to balance the weight of said basket; and means connected to the top of said swinging frame to move the same from side to side upon its centers of oscillation, substantially as hereinbefore set forth.

2. The combination, with a dipping-tank and a washing-tank arranged side by side, of the swinging frame composed of the bars F F' united by a rigid cross-bar; the top cross-bar from which said side bars are suspended; the pivoted arms G connected at their upper ends to the said top bar; the counterweights on the lower ends of said arms; the dipping-basket E pivoted in the lower end of the side bars of the swinging frame and having laterally-projecting studs $E^2$ on the sides; the fixed hooks R R on the side of the washing-tank; and means connected to the said swinging frame for moving the same on its centers of oscillation, substantially as hereinbefore set forth.

3. The combination, with the swinging frame composed of the side bars F, rigid cross-bar and top bar F', the pivoted side arms G having the side bars attached to their outer ends and provided with counterweights $G^2$ on their lower ends; of the basket E pivoted in the lower ends of the side bars, the cords H I, sheaves K L N N' and the ropes $H^\times L^\times$ arranged to operate as hereinbefore set forth.

4. The combination, of the swinging frame, the dipping-basket suspended in said frame, the fixed hooks R R the roller-studs on the sides of the basket adapted to engage said hooks and tilt the basket as described, and means connected to said swinging frame to move the basket as set forth.

5. The combination, with the basket-carrying bars E F to the lower end of which the basket is attached; of the pivoted oscillating arms having said carrying-bars attached to their upper ends, counterweights on their lower ends, and means attached to the upper ends of the said bars for swinging the same on the centers formed by the pivots of the weight-carrying arms, substantially as hereinbefore set forth.

6. In a machine for dipping fruit, the combination, with a swinging basket, a dipping-tank and a washing-tank arranged side by side under said basket of the furnace, the heating-coil, the hot-water box arranged above the dipping-tank to supply the same with hot water, and the pipes connecting said water-box with the heating-coil, substantially as hereinbefore set forth.

In testimony that we claim the foregoing we have hereunto set our hands and seals.

JOSEPH LYNAM. [L. S.]
ELBRIDGE WILKINS RUSSELL. [L. S.]

Witnesses:
  W. G. HAWLEY,
  T. C. BARNETT.